March 29, 1966     A. T. STARR ETAL     3,243,593
PHOTOELECTRIC APPARATUS FOR THE MEASUREMENT OF A DIMENSION OF
A MOVING BODY INCLUDING MEANS FOR ILLUMINATING A
STATIONARY AREA OF THE PHOTOCATHODE
Filed Nov. 16, 1962     2 Sheets-Sheet 1

INVENTORS
A.T. Starr
M.O. Pelton
BY P.F.T.C. Stillwell

Pierce, Scheffler & Parker
ATTORNEYS

March 29, 1966  A. T. STARR ETAL  3,243,593
PHOTOELECTRIC APPARATUS FOR THE MEASUREMENT OF A DIMENSION OF
A MOVING BODY INCLUDING MEANS FOR ILLUMINATING A
STATIONARY AREA OF THE PHOTOCATHODE
Filed Nov. 16, 1962  2 Sheets-Sheet 2

INVENTORS
A. T. Starr
M. O. Pelton
BY P.F.T.C. Stillwell
Pierce, Scheffler & Parker
ATTORNEYS United States Patent Office 3,243,593
Patented Mar. 29, 1966

3,243,593
PHOTOELECTRIC APPARATUS FOR THE MEASUREMENT OF A DIMENSION OF A MOVING BODY INCLUDING MEANS FOR ILLUMINATING A STATIONARY AREA OF THE PHOTOCATHODE
Arthur Tisso Starr, New Barnet, Martin Oakley Pelton, Latchmore Grove, and Peter Frederic Thomas Cryer Stillwell, Aylesbury, England, assignors, by mesne assignments, to The Rank Organisation Ltd., London, England, a British company
Filed Nov. 16, 1962, Ser. No. 238,191
Claims priority, application Great Britain, Nov. 20, 1961, 41,433/61
7 Claims. (Cl. 250—219)

This invention is concerned with improvements in or relating to the continuous measurement of a dimension of a moving body, and is concerned especially, but not exclusively, with the continuous measurement of the diameter of a wire.

In the supervision of objects which have been manufactured it is often difficult to keep a continuous check on the dimension of the manufactured object, particularly when it must not be touched or when it is moving at a considerable speed, and it is an object of the present invention to provide a method, and apparatus for carrying out the method, whereby the continuous measurement of a dimension of a moving body may be achieved.

According to one aspect of the present invention there is provided a method of continuously measuring a dimension of a moving body, such as a cable, wire or thread or a stream of liquid, in which the moving body is placed in the path of a moving beam of radiation illuminating a substantially stationary area on radiation sensitive means from a succession of directions.

The beam of radiation is preferably a beam of light having a substantially rectangular cross section, whilst the illuminated area is substantially rectangular, and said moving body throws a shadow on to said area thereby varying the intensity with which said area is illuminated. The intensity of illumination of the area is conveniently converted into an electrical signal which is proportional to the dimension of the moving body to be measured, and preferably the intensity of illumination of the area is converted into an electrical output signal by photomultiplier means, and the peak amplitude of the output signal is maintained constant, while the A.C. component is D.C. restored and peak rectified.

According to another aspect of the invention there is provided apparatus for continuously measuring a dimension of a moving body, such as a cable, wire or thread, or a stream of liquid, comprising illuminating means for illuminating a substantially stationary area on radiation sensitive means with a moving beam of radiation from a succession of directions so that the moving body is in the path of said beam, and throws a shadow onto said area, thereby varying the intensity with which said area is illuminated.

The illuminating means preferably comprise a light source, a first lens, masked by a substantially rectangular slit, a mirror capable of vibrating at high frequency, and a second lens which is associated with an aperture. The illuminating means may alternatively comprise a rotating aperture, or a rotating mirror, the plane of which is at an angle to the normal of the axis of rotation.

The radiation sensitive means preferably comprise a photomultiplier connected to a circuit for ensuring constant peak voltage output irrespective of variations such as those caused by fluctuations in brightness of the beam of radiation, while the circuit preferably comprises an amplifier connected to rectifier means, which in turn are connected to a differential amplifier, and the output of said differential amplifier is supplied to said photo-multiplier by the intermediary of a power supply after comparison with a predetermined voltage. Further rectifier means are preferably provided for D.C. restoring and peak rectifying the A.C. component of the output of the photo-multiplier.

Embodiments of the apparatus and method according to the present invention will now be particularly described hereinafter with reference to the accompanying drawings, in which.

Figure 1:
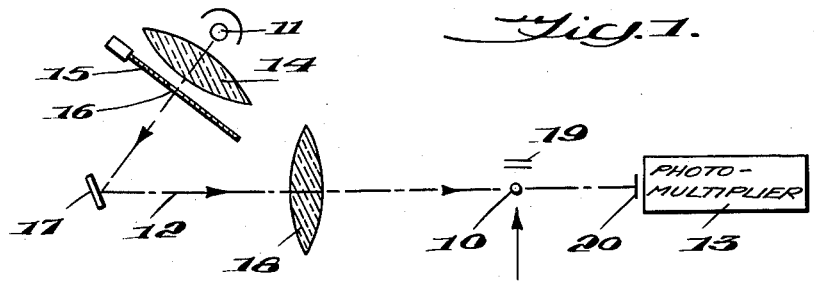
FIGURE 1 is a diagrammatic representation of a first embodiment of the apparatus.

Referring to FIGURE 1 of the drawings, apparatus for continuously measuring the diameter of a cable 10 issuing from an extrusion press, not shown, comprises illuminating means 11 which project a beam of light 12 onto the face of a photomultiplier 13 from a succession of different directions. The beam of light 12 is of rectangular cross section and is thrown onto the same area of the face of the photomultiplier 13 whatever the direction of incidence, and the cable 10 whose diameter is to be measured continuously is arranged to run perpendicular to the plane of sweep of the beam of light 12.

The beam of light 12 is formed by a light source 11, the beam of which passes through a first lens 14 in the form of a condenser masked by a plate 15 provided with a rectangular slit 16 and is condensed on the mirror 17 of a galvanometer. The incident beam is reflected by the galvanometer mirror 17, and passes through a second lens 18, which may be provided with an adjustable aperture, not shown. The second lens 18 forms an image 19 of the slit 16 in the space through which the cable 10 is arranged to pass, and also forms an image 20 of the mirror 17 on the face of the photo-multiplier 13. When the mirror 17 of the galvanometer is vibrated at high frequency, the image 19 of the slit 16 oscillates across the cable 10 while the image 20 of the mirror 17 always illuminates the same area of the photomultiplier 13, and as the image 19 of the slit 16 traverses the cable 10, the intensity of light falling on the photomultiplier 13 varies.

Figure 2:
FIGURES 2 and 3 are diagrammatic illustrations showing respectively the unobscured and partially occulated states of an element of the apparatus shown in FIGURE 1.
Figure 3:

In the case where the beam of light 12 falls on the face of the photomultiplier 13 without touching the cable 10, as shown in FIGURE 2, an output is produced by the photomultiplier 13 but when the beam of light 12 is stopped by the cable 10 in its path the area illuminated by the beam 12 is darkened by the shadow thrown by the cable 10 as shown in FIGURE 3. A reduced output from the photomultiplier 13 consequently appears. As the light beam 12 sweeps back and forth across the cable 10, the output from the photomultiplier 13 comprises a wave form having a substantially constant D.C. component and an A.C. component in the form of valleys caused by the shadow of the cable 10.

Figure 4:
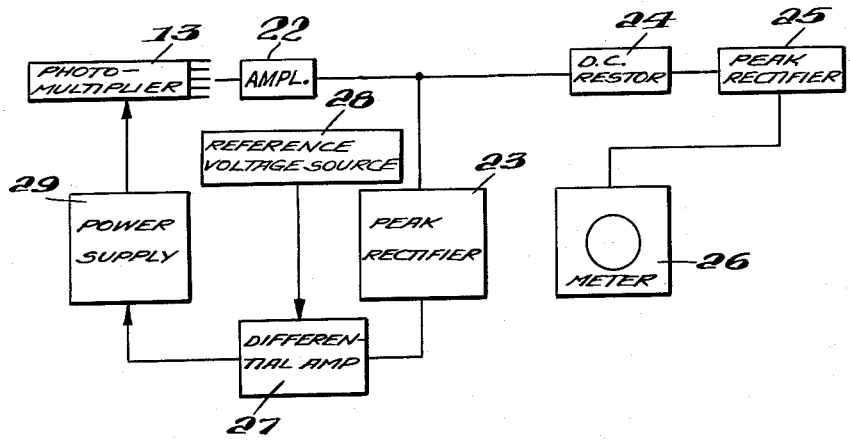
FIGURE 4 is a block diagram of the electrical circuit connected to the radiation sensitive means of the apparatus shown in FIGURE 1.

Referring to FIGURE 4, the output from the photomultiplier 13 is fed to an amplifier 22 which in turn is connected to a peak rectifier unit 23. The A.C. component is D.C. restored in the device 24 and peak rectified in a peak rectifier unit 25 to give a reading on an instrument 26 of a signal which is proportional to the diameter of the cable 10 being measured.

In order to allow for variations in the D.C. component of the photomultiplier 13 such as those caused by variations in the brightness of the beam of light 12 caued by dust or by fluctuations in the brightness of the light source 11, the rectifier 23 is connected to a differential amplifier 27 where the peak D.C. of the photomultiplier output waveform is compared with a predetermined voltage obtained from a reference source 28, and the output of the differential amplifier 27 is used as the control voltage for a power supply 29 to which it is connected, and which in turn is connected to the photomultiplier 13. By this means a constant D.C. level of the output of the photomultiplier 13 is maintained, thus rendering the apparatus independent of the light intensity.

The same result may be achieved by using a silicon or other photo-electric cell instead of the photomultiplier 13 and controlling the light intensity so as to maintain a constant peak output from the photo-electric cell. Here, instead of controlling the gain of the differential amplifier by a voltage obtained from a comparison between the peak cell output and a reference voltage obtained from the reference source 28, the brightness of the light source 11 is controlled by the same signal.

Figure 5:
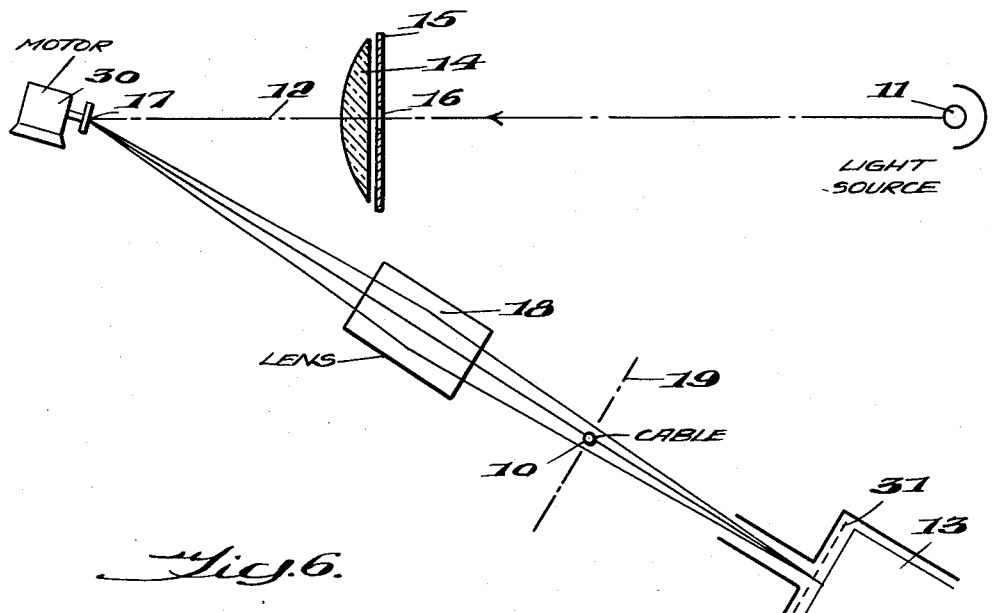
FIGURE 5 is a diagrammatic representation of a second embodiment of the apparatus using different illuminating means.

Referring to FIGURE 5, in a second embodiment of apparatus according to the present invention the beam of light 12 is caused to oscillate as before by replacing the vibrating galvanometer mirror by a rotating mirror 17 arranged with its plane at an angle to the normal of the axis of rotation. The mirror is mounted on the spindle of an electric motor 30, while the photomultiplier used in this embodiment of the apparatus is provided with a neutral filter 31. The reference numeral 19 indicates the plane in which the image 19 of the slit 16 moves.

Figure 6:
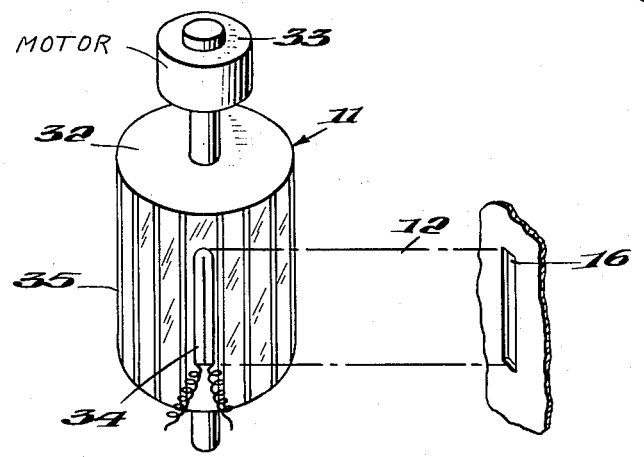
FIGURE 6 is a perspective view of an alternative light source which may be used as the illuminating means of apparatus according to the present invention.

In FIGURE 6 an alternative light source 11 comprises a rotating transparent cylinder 32 driven by a motor 33, and provided with a filament lamp 34 arranged coincident with the axis of rotation of the cylinder 32. The surface of the transparent cylinder 32 is provided with a number of evenly spaced opaque strips 35, so that as the cylinder 32 rotates beams of light 12 sweep past the slit 16.

It will be appreciated that other variations of apparatus may be introduced. For example, the beam of light may be formed by means of a spiral aperture, or an oscillating image of a slit may be produced by a rotating eccentric lens or by direct mechanical means, or the final output signal may be arranged to be proportional to the deviation of the cable diameter from a predetermined desired value.

It will further be appreciated that movement of the object being measured out of the line of measurement, for example flapping of the cable 10, will not affect the accuracy of measurment of its diameter.

We claim:
1. Apparatus for continuously measuring a dimension of a moving body, such as a cable, wire or thread, comprising a light source, a mirror located in spaced relation to said light source and receiving therefrom a single light beam having a slit-like configuration, optical means located in the path of reflection of said slit-like beam from said mirror for establishing an image thereof in a plane through which said moving body passes, said optical means also forming an image of said mirror on the face of a radiation sensitive device and which latter is located beyond said image plane, and means effecting movement of said mirror to produce a back and forth movement of said slit-like image across said moving body while maintaining continuous illumination of the same area of said radiation sensitive device by said mirror image thereby to effect a variation in the intensity of the light falling upon said area of said radiation sensitive device as said slit-like image transverses said moving body.

2. Apparatus according to claim 1, wherein said means for effecting movement of said mirror is constituted by means which vibrate the mirror in an oscillatory manner at a relatively high frequency.

3. Apparatus according to claim 1 wherein said means for effecting movement of said mirror is constituted by means which rotate the mirror with the plane of the mirror surface disposed at an angle to a normal to the axis of rotation thereof.

4. Apparatus according to claim 1, wherein said radiation sensitive device comprises a photomultiplier connected to a circuit for ensuring constant direct current output of said photomultiplier irrespective of variations such as those caused by fluctuations in brightness of said reflected beam.

5. Apparatus according to claim 4, wherein said circuit comprises an amplifier connected to rectifier means, which in turn are connected to a differential amplifier associated with a reference voltage source, and the output of said differential amplifier controls the power supply of said photomultiplier.

6. Apparatus according to claim 5, wherein said circuit also includes rectifier means arranged for D.C. restoring and peak rectifying the A.C. component of the output of said photomultiplier.

7. Apparatus according to claim 1 and which further includes a reference voltage, means comparing the voltage peak output from said radiation sensitive device with said reference voltage to obtain a control voltage, and means utilizing said control voltage to control the brightness of the light produced by said light source.

References Cited by the Examiner

UNITED STATES PATENTS

| 2,173,994 | 9/1939 | Anderson | 179—121 |
| 2,548,755 | 4/1951 | Vossberg et al. | 250—219 |
| 2,758,502 | 8/1956 | Scott et al. | 250—216 X |
| 2,812,685 | 11/1957 | Vossberg | 250—219 |
| 2,850,645 | 9/1958 | Chilton et al. | 250—219 |
| 2,999,590 | 9/1961 | Gerhardt | 88—14 |

FOREIGN PATENTS 1,112,640   8/1961   Germany.

RALPH G. NILSON, *Primary Examiner.*

ARCHIE R. BORCHELT, *Examiner.*

E. STRICKLAND, M. A. LEAVITT,
*Assistant Examiners.*